United States Patent
Peng et al.

(10) Patent No.: US 7,850,777 B2
(45) Date of Patent: Dec. 14, 2010

(54) METHOD OF PREPARING SEMICONDUCTOR NANOCRYSTAL COMPOSITIONS

(75) Inventors: Adam Peng, Schenectady, NY (US); Margaret Hines, Troy, NY (US); Susanthri Perera, Latham, NY (US)

(73) Assignee: Evident Technologies, Troy, NY (US)

( * ) Notice: Subject to any disclaimer, the term of this patent is extended or adjusted under 35 U.S.C. 154(b) by 705 days.

(21) Appl. No.: 11/680,047

(22) Filed: Feb. 28, 2007

(65) Prior Publication Data

US 2007/0289491 A1 Dec. 20, 2007

Related U.S. Application Data

(60) Provisional application No. 60/813,464, filed on Jun. 15, 2006.

(51) Int. Cl.
*C30B 9/00* (2006.01)
(52) U.S. Cl. .............................. 117/68; 117/71; 117/72; 117/73; 117/75
(58) Field of Classification Search .................. 117/68, 117/71, 72, 73, 75, 76
See application file for complete search history.

(56) References Cited

U.S. PATENT DOCUMENTS

| 4,263,064 | A | | 4/1981 | Clawson et al. |
|---|---|---|---|---|
| 6,576,291 | B2 | | 6/2003 | Bawendi et al. |
| 6,869,545 | B2 | * | 3/2005 | Peng et al. ............ 252/301.6 S |
| 2003/0173541 | A1 | * | 9/2003 | Peng et al. ............ 252/301.4 R |
| 2006/0014040 | A1 | | 1/2006 | Peng et al. |
| 2006/0094860 | A1 | | 5/2006 | Take |
| 2006/0130741 | A1 | * | 6/2006 | Peng et al. .................... 117/68 |

OTHER PUBLICATIONS

PCT Notification Concerning Transmittal of International Preliminary Report on Patentability (Chapter 1 of the Patent Cooperation Treaty) dated Dec. 31, 2008.
PCT International Search Report for PCT/US 2007/71218 dated Dec. 6, 2007.

* cited by examiner

*Primary Examiner*—Robert M Kunemund
(74) *Attorney, Agent, or Firm*—Hoffman Warnick LLC

(57) ABSTRACT

A semiconductor nanocrystal composition comprising a Group V to VI semiconductor material and a method of making same. The method includes synthesizing a semiconductor nanocrystal core, where the synthesizing includes dissolving a Group V to VI anion gas in a first solvent to produce a Group V to VI anion precursor, preparing a cation precursor, and reacting the Group V to VI anion precursor with the cation precursor in the presence of a second solvent. The reacting may occur in a high pressure vessel.

18 Claims, 6 Drawing Sheets

METHOD OF PREPARING SEMICONDUCTOR NANOCRYSTAL COMPOSITIONS

CROSS REFERENCE TO RELATED APPLICATIONS

The present application claims priority to U.S. Provisional Patent Application No. 60/813,464, filed Jun. 15, 2006, which is incorporated by reference herein.

FIELD OF THE INVENTION

The present invention relates to semiconductor nanocrystal compositions. The present invention also relates to methods of making semiconductor nanocrystal compositions, including in a closed system.

BACKGROUND OF THE INVENTION

Semiconductor nanocrystals are typically tiny crystals of II-VI, III-V, IV-VI materials that have a diameter between 1 nanometer (nm) and 20 nm. In the strong confinement limit, the physical diameter of the nanocrystal is smaller than the bulk exciton Bohr radius causing quantum confinement effects to predominate. In this regime, the nanocrystal is a 0-dimensional system that has both quantized density and energy of electronic states where the actual energy and energy differences between electronic states are a function of both the nanocrystal composition and physical size. Larger nanocrystals have more closely spaced energy states and smaller nanocrystals have the reverse. Because interaction of light and matter is determined by the density and energy of electronic states, many of the optical and electric properties of nanocrystals can be tuned or altered simply by changing the nanocrystal geometry (i.e. physical size).

Single nanocrystals or monodisperse populations of nanocrystals exhibit unique optical properties that are size tunable. Both the onset of absorption and the photoluminescent wavelength are a function of nanocrystal size and composition. The nanocrystals will absorb all wavelengths shorter than the absorption onset, however, photoluminescence will always occur at the absorption onset. The bandwidth of the photoluminescent spectra is due to both homogeneous and inhomogeneous broadening mechanisms. Homogeneous mechanisms include temperature dependent Doppler broadening and broadening due to the Heisenburg uncertainty principle, while inhomogeneous broadening is due to the size distribution of the nanocrystals. The narrower the size distribution of the nanocrystals, the narrower the full-width half max (FWHM) of the resultant photoluminescent spectra. In 1991, Brus wrote a paper reviewing the theoretical and experimental research conducted on colloidally grown semiconductor nanocrystals, such as cadmium selenide (CdSe) in particular. Brus L., "Quantum Crystallites and Nonlinear Optics," *Applied Physics A*, 53 (1991)). That research, precipitated in the early 1980's by the likes of Efros, Ekimov, and Brus himself, greatly accelerated by the end of the 1980's as demonstrated by the increase in the number of papers concerning colloidally grown semiconductor nanocrystals.

Quantum yield (i.e. the percent of absorbed photons that are reemitted as photons) is influenced largely by the surface quality of the nanocrystal. Photoexcited charge carriers will emit light upon direct recombination but will give up the excitation energy as heat if photon or defect mediated recombination paths are prevalent. Because the nanocrystal may have a large surface area to volume ratio, dislocations present on the surface or adsorbed surface molecules having a significant potential difference from the nanocrystal itself will tend to trap excited state carriers and prevent radioactive recombination and thus reduce quantum yield. It has been shown that quantum yield can be increased by removing surface defects and separating adsorbed surface molecules from the nanocrystal by adding a shell of a semiconductor with a wider bulk bandgap than that of the core semiconductor.

Inorganic colloids have been studied for over a century ever since Michael Faraday's production of gold sols in 1857. Rossetti and Brus began work on semiconductor colloids in 1982 by preparing and studying the luminescent properties of colloids consisting of II-VI semiconductors, namely cadmium sulfide (CdS). (Rossetti, R.; Brus L., "Electron-Hole Recombination Emission as a Probe of Surface Chemistry in Aqueous CdS Colloids," *J. Phys. Chem.*, 86, 172 (1982)). In that paper, they describe the preparation and resultant optical properties of CdS colloids, where the mean diameter of the suspended particles is greater than 20 nm. Because the sizes of the particles were greater than the exciton Bohr radius, quantum confinement effects that result in the blue shifting of the fluorescence peak was not observed. However, fluorescence at the bulk band edge energies were observed and had a FWHM of 50-60 nm.

CdS colloids exhibiting quantum confinement effects (blue shifted maxima in the absorption spectra) have been prepared since 1984. (Fotjik A., Henglein A., *Ber. Bunsenges. Phys. Chem.*, 88, (1984); Fischer C., Fotjik A., Henglein A., *Ber. Bunsenges. Phys. Chem.*, (1986)). In 1987, Spanhel and Henglein prepared CdS colloids having mean particle diameters between 4 and 6 nm. (Spanhel L., Henglein A., "Photochemistry of Colloidal Semiconductors, Surface Modification and Stability of Strong Luminescing CdS Particles," *Am. Chem. Soc.*, 109 (1987)). The colloids demonstrated quantum confinement effects including the observation of size dependent absorption maxima (first exciton peaks) as well as size dependent fluorescent spectra. The colloids were prepared by bubbling a sulfur containing gas ($H_2S$) through an alkaline solution containing dissolved cadmium ions. The size and resultant color (of the fluorescence) of the resultant nanocrystals were dependent upon the pH of the solution. The colloids were further modified or "activated" by the addition of cadmium hydroxide to the solution that coated the suspended nanocrystals. The resultant core-shell nanocrystals demonstrated that the quantum yield of the photoluminescence increased from under 1% to well over 50% with a FWHM of the photoluminescent spectra under 50 nm for some of the preparations.

Kortan and Brus developed a method for creating CdSe coated zinc sulfide (ZnS) nanocrystals and the opposite, zinc sulfide coated cadmium selenide nanocrystals. (Kortan R., Brus L., "Nucleation and Growth of CdSe on ZnS Quantum Crystallite Seeds, and Vice Versa, in Inverse Micelle Media," *J. Am. Chem. Soc.*, 112 (1990)). The preparation grew ZnS on CdSe "seeds" using an organometallic precursor-based inverse micelle technique and kept them in solution via an organic capping layer (thiol phenol). The CdSe core nanocrystals had diameters between 3.5 and 4 nm and demonstrated quantum confinement effects including observable exciton absorption peaks and blue shifted photoluminescence. Using another preparation, CdSe cores were coated by a 0.4 nm layer of ZnS. The photoluminescence spectra of the resultant core-shell nanocrystals indicates a peak fluorescence at 530 nm with an approximate 40-45 nm FWHM.

Murray and Bawendi developed an organometallic preparation capable of making CdSe, CdS, and CdTe nanocrystals. (Murray C., Norris D., Bawendi M., "Synthesis and Characterization of Nearly Monodisperse CdE (E=S, Se, Te) Semiconductor Nanocrystallites," *J. Am. Chem. Soc.*, 115, (1993)). This work, based on the earlier works of Brus, Henglein, Peyghambarian, allowed for the growth of nanocrystals having a diameter between 1.2 nm and 11.5 nm and with a narrow size distribution (<5%). The synthesis involved a homogeneous nucleation step followed by a growth step. The nucleation step is initiated by the injection of an organometallic cadmium precursor (dimethyl cadmium) with a selenium precursor (TOPSe-trioctylphosphine selenide) into a heated bath containing coordinating ligands (TOPO-trioctylphosphineoxide). The precursors disassociate in the solvent, causing the cadmium and selenium to combine to form a growing nanocrystal. The TOPO coordinates with the nanocrystal to moderate and control the growth. The resultant nanocrystal solution showed an approximate 10% size distribution, however, by titrating the solution with methanol the larger nanocrystals could be selectively precipitated from the solution thereby reducing the overall size distribution. After size selective precipitation, the resultant nanocrystals in solution were nearly monodisperse (capable of reaching a 5% size distribution) but were slightly prolate (i.e. nonspherical having an aspect ratio between 1.1 and 1.3). The photoluminescence spectra show a FWHM of approximately 30-35 nm and a quantum yield of approximately 9.6%.

Katari and Alivisatos slightly modified the Murray preparation to make CdSe nanocrystals. (Katari J., Alivisatos A., "X-ray Photoelectron Spectroscopy of CdSe Nanocrystals with Applications to Studies of the Nanocrystal Surface," *J. Phys. Chem.*, 98 (1994)). They found that by substituting the selenium precursor TOPSe with TBPSe (TriButylPhosphine-Selenide), nanocrystals were produced that were nearly monodisperse without size selective precipitation, crystalline, and spherical. The nanocrystals were size tunable from 1.8 nm to 6.7 nm in diameter and had an exciton peak position ranging from 1.9-2.5 eV (corresponding to 635-496 nm wavelength). Like the Murray paper, TOPO was used as the coordinating ligand.

Hines and Guyot-Sionest developed a method for synthesizing a ZnS shell around a CdSe core nanocrystal. (Hines et al., "Synthesis and Characterization of strongly Luminescing ZnS capped CdSe Nanocrystals," J. Phys. Chem., 100:468-471 (1996)). The CdSe cores, having a monodisperse distribution between 2.7 nm and 3.0 nm (i.e. 5% size distribution with average nanocrystal diameter being 2.85 nm), were produced using the Katari and Alivisatos variation of the Murray synthesis. The photoluminescence spectra of the core show a FWHM of approximately 30 nm with a peak at approximately 540 nm. The core CdSe nanocrystals were separated, purified, and resuspended in a TOPO solvent. The solution was heated and injected with zinc and sulfur precursors (dimethyl zinc and $(TMS)_2S$) to form a ZnS shell around the CdSe cores. The resultant shells were 0.6±3 nm thick, corresponding to 1-3 monolayers. The photoluminescence of the core-shell nanocrystals had a peak at 545 nm, FWHM of 40 nm, and a quantum yield of 50%.

One exemplary problem associated with known colloidal synthesis methods is that they are limited in regard to the growth of high quality III-V semiconductor nanocrystals due, at least in part, to the covalent nature of the material. Past attempts at growing III-V semiconductor nanocrystals have resulted in quantum yields of approximately 10%. Micic et al., *J. Phys. Chem. B.*, 104, 12149-12156 (2000). It has been shown using a slow growth technique that indium phosphate (InP) core nanocrystals with a shell of zinc sulfide (ZnS) may result in quantum yields of 20% but this process takes days to complete. Haubold et al., *Chem Phys Chem*, 5, 331 (2001). Many applications of nanocrystal compositions, such as LEDs, inks, and pigments, require higher luminescent quantum yields.

Additionally, the growth of III-V nanocrystals is difficult because of the need for vacuum growth and strict humidity conditions. Etching has shown to improve the quantum yield of III-V materials however, the etching process introduces problems when bonding ligands to the surface of the nanocrystals. This causes poor colloidal stability and makes the compositions incompatible for a variety of applications. In addition, the etched surface does not provide sufficient electronic passivation. As a result, electronic interaction between a matrix material and the nanocrystal may result in fluorescence quenching.

Accordingly, there is a need in the art to develop a stable semiconductor nanocrystal composition that is brightly fluorescing and soluble in most common solvents.

SUMMARY OF THE INVENTION

In an embodiment, the present invention provides a semiconductor nanocrystal composition comprising a Group V to VI semiconductor material prepared from a Group V to VI anion precursor that includes a Group V to VI anion gas.

In another embodiment, the present invention provides a method of making a semiconductor nanocrystal composition employing a Group V to VI anion precursor that includes a Group V to VI anion gas. The use of a Group V to VI precursor, such as a phosphine precursor, allows for the production of semiconductor nanocrystal compositions with high quantum yields. Additionally, a Group V to VI anion gas, such as a phosphine gas, is a much cheaper and more readily available precursor than traditional precursors for the production of Group V to VI containing semiconductor nanocrystal compositions, such as phosphide containing semiconductor nanocrystal compositions.

In still another embodiment, the present invention further provides a method of making semiconductor nanocrystal compositions in a high pressure reaction vessel. A high pressure reaction vessel is attractive because its closed system makes more efficient use of a Group V to VI precursor than traditional reaction vessels. In addition, the high pressure is advantageous for crystallization and growth of high quality nanocrystals and allows for lower reaction temperature with high reaction rate.

DETAILED DESCRIPTION OF THE INVENTION

Figure 1:
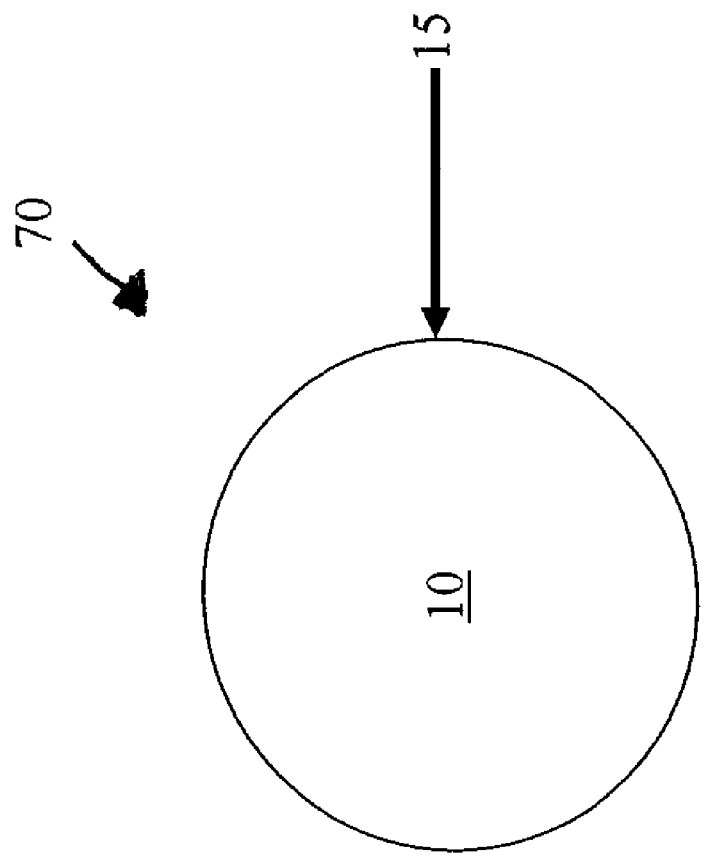
FIG. 1 is a schematic illustration of a semiconductor nanocrystal composition according to an embodiment of the present invention.

The present invention provides methods of preparing semiconductor nanocrystal compositions. Referring to FIG. 1, in an embodiment, the present invention provides a semiconductor nanocrystal composition 70 comprising a semiconductor nanocrystal core 10 (also known as a semiconductor nanoparticle or semiconductor quantum dot) having an outer surface 15. Semiconductor nanocrystal core 10 may be spherical nanoscale crystalline materials (although oblate and oblique spheroids can be grown as well as rods and other shapes) having a diameter of less than the Bohr radius for a given material and typically but not exclusively comprises II-IV, III-V, or IV-VI binary semiconductors. Non-limiting examples of semiconductor materials that semiconductor nanocrystal core can comprise include ZnS, ZnSe, ZnTe, CdS, CdSe, CdTe, HgS, HgSe, HgTe (II-VI materials), PbS, PbSe, PbTe (IV-VI materials), AlN, AlP, AlAs, AlSb, GaN, GaP, GaAs, GaSb, InN, InP, InAs, InSb (III-V materials). In a preferred embodiment of the present invention, semiconductor nanocrystal core 10 comprises III-V semiconductor nanocrystal materials. In addition to binary semiconductors, semiconductor nanocrystal core may comprise ternary, quaternary, or quintary semiconductor materials. Non-limiting examples of ternary, quaternary, or quintary semiconductor materials include $A_xB_yC_zD_wE$ wherein A and/or B may comprise a group I and/or VII element, and C and D may comprise a group II, III, and/or IV element, and E may comprise a group V or VI element, and x, y, z, and w are molar fractions between 0 and 1. In a preferred embodiment of the present invention, the D element may comprise a group III material and the E element may comprise a group V material.

Figure 2:
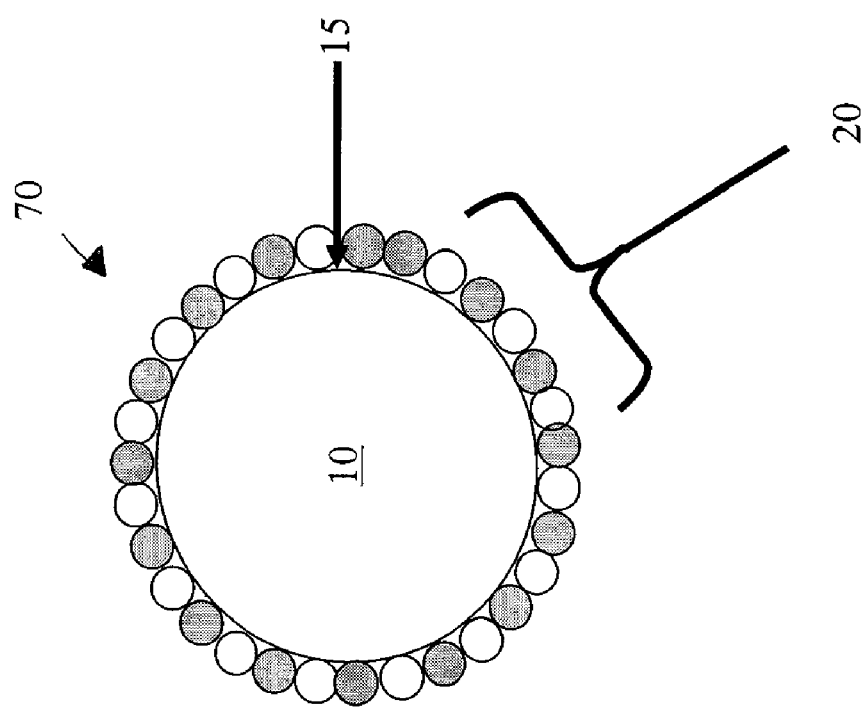
FIG. 2 is a schematic illustration of a semiconductor nanocrystal composition according to another embodiment of the present invention.

Referring to FIG. 2, in an alternative embodiment, one or more metals 20 are formed on outer surface 15 of semiconductor nanocrystal core 10 (referred to herein as "metal layer" 20) after formation of core 10. Metal layer 20 may act to passivate outer surface 15 of semiconductor nanocrystal core 10 and limit the diffusion rate of oxygen molecules to semiconductor nanocrystal core 10. Metal layer 20 is formed on outer surface 15 after synthesis of semiconductor nanocrystal core 10 (as opposed to being formed on outer surface 15 concurrently during synthesis of semiconductor nanocrystal core 10). Metal layer 20 is typically between 0.1 nm and 5 nm thick. Metal layer 20 may include any number, type, combination, and arrangement of metals. For example, metal layer 20 may be simply a monolayer of metals formed on outer surface 15 or multiple layers of metals formed on outer surface 15. Metal layer 20 may also include different types of metals arranged, for example, in alternating fashion. Further, metal layer 20 may encapsulate semiconductor nanocrystal core 10 as shown in FIG. 2 or may be formed on only parts of outer surface 15 of semiconductor nanocrystal core 10. Metal layer 20 may include the metal from which the semiconductor nanocrystal core is made either alone or in addition to another metal. Non-limiting examples of metals that may be used as part of metal layer 20 include Cd, Zn, Hg, Pb, Al, Ga, or In.

Figure 3:
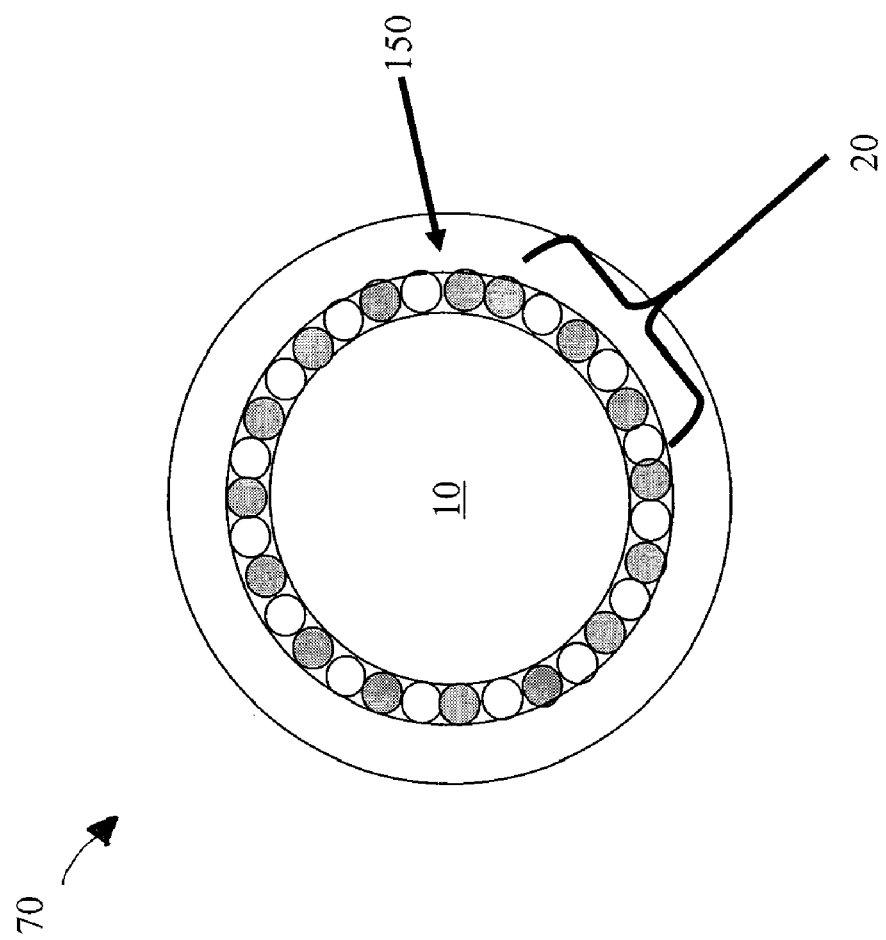
FIG. 3 is a schematic illustration of a semiconductor nanocrystal composition according to another embodiment of the present invention.

Referring to FIG. 3, in an alternate embodiment, the present invention provides a nanocrystal composition 70 further comprising a shell 150 overcoating metal layer 20. Shell 150 may comprise a semiconductor material having a bulk bandgap greater than that of semiconductor nanocrystal core 10. In such an embodiment, metal layer 20 may act to passivate outer surface 15 of semiconductor nanocrystal core 10 as well as to prevent or decrease lattice mismatch between semiconductor nanocrystal core 10 and shell 150. Shell 150 may be grown around metal layer 20 and is typically between 0.1 nm and 10 nm thick. Shell 150 may provide for a type A semiconductor nanocrystal composition 70. Shell 150 may comprise various different semiconductor materials such as, for example, CdSe, CdS, CdTe, ZnS, ZnSe, ZnTe, HgS, HgSe, HgTe, InP, InAs, InSb, InN, GaN, GaP, GaAs, GaSb, PbSe, PbS, PbTe, $CuInGaS_2$, $CuInGaSe_2$, $AgInS_2$, $AgInSe_2$, $AuGaTe_2$, ZnCuInS2.

The presence of metal layer 20 may provide for a more complete and uniform shell 150 without the amount of defects that would be present with a greater lattice mismatch. Such a result may improve the quantum yield of resulting nanocrystal composition 70.

Figure 4:
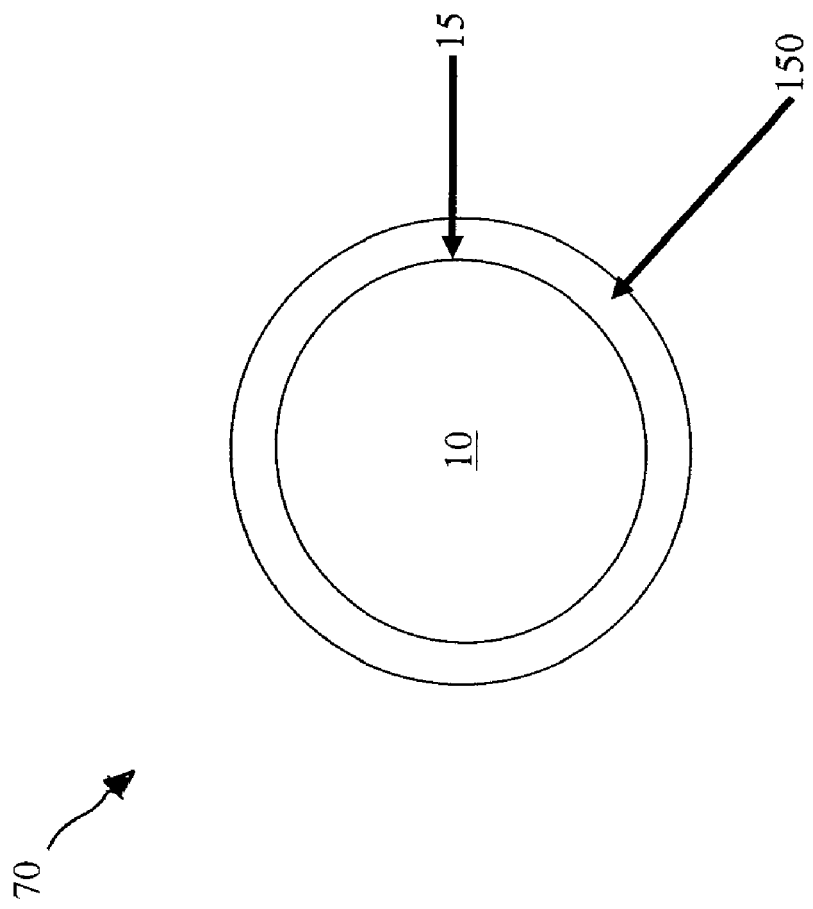
FIG. 4 is a schematic illustration of a semiconductor nanocrystal composition according to another embodiment of the present invention.

Referring to FIG. 4, in an alternate embodiment, the present invention provides a nanocrystal composition 70 comprising a semiconductor nanocrystal core 10 having an outer surface 15, as described above, and a shell 150, as described above, formed on the outer surface 15 of the core 10. The shell 150 may encapsulate semiconductor nanocrystal core 10 as shown in FIG. 4 or may be formed on only parts of outer surface 15 of semiconductor nanocrystal core 10.

A semiconductor nanocrystal composition, according to the present invention, is electronically and chemically stable with a high luminescent quantum yield. Chemical stability refers to the ability of a semiconductor nanocrystal composition to resist fluorescence quenching over time in aqueous and ambient conditions. Preferably, the semiconductor nanocrystal compositions resist fluorescence quenching for at least a week, more preferably for at least a month, even more preferably for at least six months, and most preferably for at least a year. Electronic stability refers to whether the addition of electron or hole withdrawing ligands substantially quenches the fluorescence of the semiconductor nanocrystal composition. Preferably, a semiconductor nanocrystal composition would also be colloidally stable in that when suspended in organic or aqueous media (depending on the ligands) they remain soluble over time. Preferably, a high luminescent quantum yield equals a quantum yield of at least 25%. Quantum yield may be measured by comparison to Rhodamine 6G dye with a 488 excitation source. Preferably, the quantum yield of the semiconductor nanocrystal composition is at least 30%, more preferably at least 45%, and even more preferably at least 55%, and even more preferably at least 60%, including all intermediate values therebetween, as measured under ambient conditions. The semiconductor nanocrystal compositions of the present invention experience little loss of fluorescence over time and can be manipulated to be soluble in organic and inorganic solvents as traditional semiconductor nanocrystals.

Figure 5:
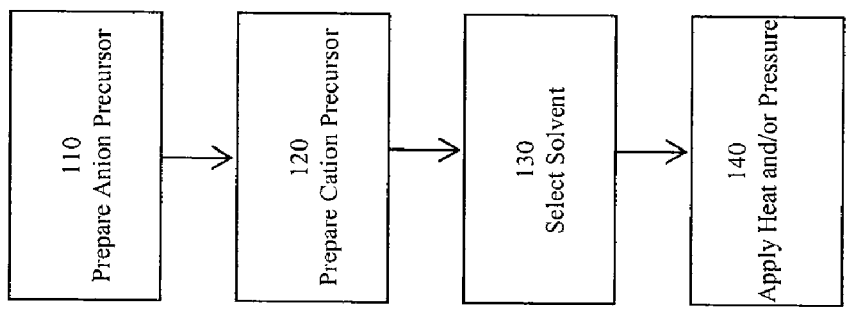
FIG. 5 is a flow chart of an exemplary method of making a semiconductor nanocrystal composition according to an embodiment of the present invention.

FIG. 5 provides an exemplary method of making a semiconductor nanocrystal composition of the present invention. Although the exemplary method will be described with respect to the preparation of an InP semiconductor nanocrystal core, it will be appreciated that other types and combinations of semiconductor cores may be prepared including group V to VI compounds. A Group V to VI gas, such as phosphine gas, may be dissolved into an organic solvent, such as toluene or benzene, and mixed with other precursors in a high pressure reaction vessel, closed system or reactor for synthesis of the semiconductor nanocrystal cores. Although the present invention is not limited to such systems, high pressure reaction vessels are attractive because their closed system makes more efficient use of the Group V to VI precursors than bubbling the Group V to VI gas through synthesis solvents in traditional reaction vessels. In addition, the high pressure is advantageous for crystallization and growth of high quality nanocrystals and allows for lower reaction temperature with high reaction rate.

In step 110, a Group V to VI gas anion or precursors is added to a solution to create an anion precursor. Examples of gas anions or precursors include phosphorus compounds, such as t-$Bu_2PH$, t-$BuPH_2$ (low boiling point liquid—55° C.), bisphenylphosphine ($Ph_2PH$), phenylphosphine ($PhPH_2$), or trisdimethylaminophosphorus $((CH_3)_2N)_3P$. Specifically, an anion gas of high purity may first be purchased, for example from Sigma-Aldrich or other gas suppliers. Then, the anion gas, such as phosphine gas, may be bubbled through a desired solvent slowly under inert conditions at room temperature. Examples of solvents include alcohol, toluene, and benzene, which are able to become saturated under inert conditions at room temperature based on the solubility properties of these solvents. The prepared solvent containing the desired anion may be stored in a refrigerator inside of a glove box, preferably between −20° C. and 30° C. to maintain its solubility and stability. This prepared solvent containing the desired anion may be used as an anion precursor for a method of producing semiconductor nanocrystal compositions of the present invention.

In step 120, cation precursors are prepared, such as, for example, Group I to IV compounds. Examples of cation precursors include indium compounds, such as indium acetate, indium chloride, indium oxide, etc. Different precursors may require different methods of preparation. For example, if using indium oxide, oleic acid may be used to dissolve indium oxide to make a clear solution. This would be followed by similar heating from, for example, 80 to 250° C., degassing and purification by vacuum for a few hours with cycles of nitrogen or argon. Once prepared, the cation precursor may be transferred into a glove box and stored preferably at room temperature as the reaction precursor.

In step 130, a non-coordinating solvent, a coordinating solvent, or both are selected for synthesis of semiconductor nanocrystal compositions. The solvents may be selected based on their boiling points, because it has been shown that a synthesis solvent's boiling point may affect the reaction pressure, which may in turn affect the rate of growth and quality of InP nanocrystals. Specifically, decreasing the solvent's boiling point generally increases the reaction pressure and reaction rate. In organometallic reactions in a microwave, superheating of solvent and vessel pressurization have been shown to give rise to a 1000-fold increase in reaction rate. Additionally, the boiling point of these synthesis solvents may change the internal pressure in this close-capped synthesis system since decreasing the boiling point generally increases the pressure and the reaction rate.

For the purposes of the present invention, different boiling point non-coordinating solvents, such as octadecene (ODE) with boiling point (b.p.) 317° C.; tetradecene, b.p. 251° C.; decane, b.p. 174° C.; decene, b.p. 167° C.; octane, b.p. 126° C.; octene, b.p. 122° C.; etc., may be used. In addition, a coordinating solvent to synthesize nanocrystals, such as InP nanocrystals, in similar conditions may be used. Coordinating solvents are typically lyophilic and have an affinity moiety for the surface of the semiconductor nanocrystal core or shell and another moiety with an affinity toward the solvent, which is usually hydrophobic. Typical examples of coordinating solvents include lyophilic surfactant molecules such as Trioctylphosphine oxide (TOPO), Trioctylphosphine (TOP), and Tributylphosphine (TBP).

In step 140, the semiconductor nanocrystal compositions are formed. The prepared anion precursor from step 110, the prepared cation precursor from step 120, and the synthesis solvent from step 130 are loaded into a high pressure reaction vessel in a glove box. For example, after loading all the reaction precursors in the reaction vessel in glove box under nitrogen or argon atmosphere in room temperature, the reaction vessel can be capped and placed into a high temperature oven or heated up by a heating mantel to reach the desired reaction temperature such as, for example, 120° C. to 300° C. for a certain period of time, such as 5 minutes to 24 hours, to synthesize the semiconductor nanocrystal compositions. This reaction temperature may be either lower or higher than the solvent boiling point. Afterwards, the reaction vessel can be taken out from the high temperature oven to cool down to room temperature, and transferred into a glove box. Standard procedures can be used to clean up and isolate the synthesized nanocrystals from the reaction solution. Thus, the semiconductor nanocrystals compositions may be prepared by a solvo-thermal method.

Depending on the synthesis solvent, different reaction temperatures can introduce different internal reaction pressures in the high pressure reaction vessel. Additionally, the addition of a Group V to VI solution affects the internal pressure, particularly for high boiling point synthesis solvents. For example, the pressure generally increases when the vessel is heated to a high temperature such as from 200° C. to 300° C. It is possible to adjust the internal pressure, for example, by adding more or less solvent in the reaction vessel (such as by adding proper amounts of solvent, such as toluene or benzene). If desired, a shell and a metal layer may be prepared on the semiconductor nanocrystal core using known shelling techniques and as described, for example, in U.S. patent application Ser. No. 11/125,129, filed on May 10, 2005, which is incorporated by reference herein.

EXAMPLE 12 mmol (3.5025 grams) of Indium acetate [$In(Ac)_3$] is mixed with 36 mmol (10.1688 grams) Oleic Acid and 300 grams octadecene (ODE) in a 500 ml reaction flask. This mixture is then heated up to between about 80° C. and 130° C. under vacuum for purification until a clean solution is obtained. This cation intermediate is degassed and purified by vacuum for a few hours with cycles of nitrogen or argon. This prepared solution is cooled down to room temperature and stored under nitrogen or argon atmosphere for indium precursors.

Figure 6:
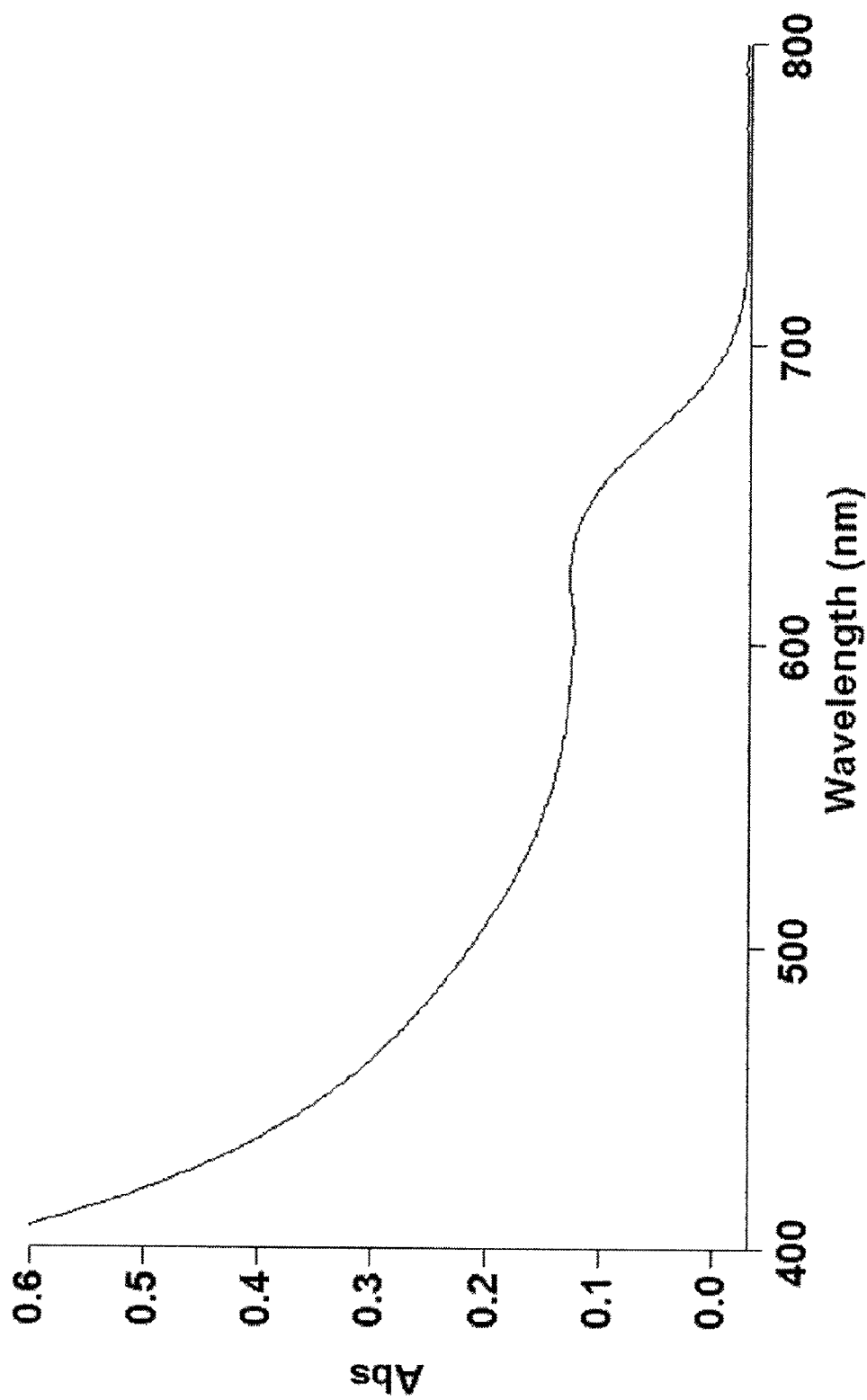
FIG. 6 is an absorption spectrum of indium phosphide nanocrystals synthesized from a high pressure reaction vessel by using phosphine gas as a phosphorus precursor.

In a typical synthesis, 30 ml prepared indium solution is mixed with 30 ml ODE in a reaction vessel in a glove box, then, 150 ml $PH_3$ benzene solution is added into the mixture. The reaction vessel is capped and sealed in the glove box at room temperature, and then is taken out from the glove box. A hose assembly (Parr Instrument, Moline Ill.) is used to connect the nitrogen cylinder through a single stage regulator to a reaction vessel. At room temperature, the internal pressure of the reaction vessel is increased from 0 psi to 1000 psi by transferring nitrogen from the nitrogen cylinder into the reaction vessel. This pressure charged vessel is heated up to 250° C. by a heating mantel and the internal pressure of the reaction vessel is approximately 1700 psi at this temperature. After maintaining the temperature at 250° C. for 30 minutes, the reaction is stopped by removing the heating mantel and nitrogen cylinder to cool down the reaction vessel to room temperature. After releasing the vessel pressure at room temperature, the vessel is opened and the solution in the reaction vessel is transferred into a centrifuge bottle. Enough acetone is added in the centrifuge bottle until the clear solution turns turbid. After centrifugation, the supernatant in the centrifuge bottle is discarded and the solid precipitate in the bottom is re-dissolved into toluene. The obtained toluene solution contains InP nanocrystals synthesized from this high pressure reaction method. The absorption spectrum of the synthesized InP nanocrystals is shown FIG. 6.

The foregoing description and example have been set forth merely to illustrate the invention and are not intended as being limiting. Each of the disclosed aspects and embodiments of the present invention may be considered individually or in combination with other aspects, embodiments, and variations of the invention. In addition, unless otherwise specified, none of the steps of the methods of the present invention are confined to any particular order of performance. Modifications of the disclosed embodiments incorporating the spirit and substance of the invention may occur to persons skilled in the art and such modifications are within the scope of the present invention. Furthermore, all references cited herein are incorporated by reference in their entirety. Moreover, it is appreciated, that although a number of problems and deficiencies may be identified herein, each embodiment may not solve each problem identified in the prior art. Additionally, to the extent a problem identified in the prior art or an advantage of the present invention is cured, solved, or lessened by the claimed invention, the solution to such problems or the advantage identified should not be read into the claimed invention.

What is claimed is:

1. A method of making a semiconductor nanocrystal composition comprising:
    synthesizing a semiconductor nanocrystal core, the synthesizing comprising:
        dissolving a Group V to VI anion gas in a first solvent to produce a Group V to VI anion precursor,
        preparing a cation precursor, and
        reacting the Group V to VI anion precursor with the cation precursor in the presence of a second solvent.

2. The method of claim 1, wherein the dissolving comprises:
    dissolving a phosphine gas in the first solvent to produce a phosphine precursor.

3. The method of claim 1, wherein the preparing comprises:
    preparing an indium precursor.

4. The method of claim 1, wherein the dissolving comprises:
    using an alcohol, toluene, benzene, or any combination thereof as the first solvent.

5. The method of claim 1, wherein the reacting comprises:
    using a non-coordinating solvent, a coordinating solvent, or any combination thereof as the second solvent.

6. The method of claim 5, wherein the using comprises:
    using an octadecene, tetradecene, decane, decene, octane, octene, or any combination thereof as the non-coordinating solvent; and
    using a trioctylphosphine oxide, trioctylphosphine, tributylphosphine, or any combination thereof as the coordinating solvent.

7. The method of claim 1, wherein the dissolving comprises:
    bubbling the Group V to VI anion gas through the first solvent.

8. The method of claim 1, wherein the semiconductor nanocrystal composition is stable with a luminescent quantum yield of at least 25%.

9. The method of claim 1, wherein the semiconductor nanocrystal core comprises indium phosphide.

10. The method of claim 1, wherein the reacting occurs in a high pressure vessel.

11. The method of claim 10, wherein the reacting occurs in the high pressure vessel at a temperature of between about 100° C. and 300° C. and a pressure of between about 10 and 3000 psi.

12. A method of making a semiconductor nanocrystal composition comprising:
    synthesizing a semiconductor nanocrystal core having an outer surface, the synthesizing comprising:
        dissolving a Group V to VI anion gas in a first solvent to produce a Group V to VI anion precursor,
        preparing a cation precursor, and
        reacting the Group V to VI anion precursor with the cation precursor in the presence of a second solvent; and forming a shell on the outer surface of the core.

13. The method of claim 12, wherein the semiconductor nanocrystal composition is stable with a luminescent quantum yield of at least 25%.

14. The method of claim 12, wherein the semiconductor nanocrystal core comprises indium phosphide.

15. The method of claim 12, wherein the shell comprises zinc sulfide.

16. A method of making a semiconductor nanocrystal composition comprising:
    synthesizing a semiconductor nanocrystal core having an outer surface, the synthesizing comprising:
        dissolving a Group V to VI anion gas in a first solvent to produce a Group V to VI anion precursor, preparing a cation precursor, and
        reacting the Group V to VI anion precursor with the cation precursor in the presence of a second solvent;
    forming a metal layer on the outer surface of the semiconductor nano crystal core; and
    overcoating the metal layer with the shell.

17. The method of claim 16, wherein the metal layer comprises zinc.

18. A semiconductor nanocrystal composition manufactured according to the method of claim 1.

* * * * *